April 10, 1962

J. H. CREIGHTON 3,028,694

CARRYING TYPE SCRAPER

Filed Jan. 27, 1960

*INVENTOR.*
JOHN H. CREIGHTON

BY

ATTORNEYS

April 10, 1962 J. H. CREIGHTON 3,028,694
CARRYING TYPE SCRAPER
Filed Jan. 27, 1960 2 Sheets-Sheet 2

*INVENTOR.*
JOHN H. CREIGHTON
BY
ATTORNEYS

United States Patent Office 3,028,694
Patented Apr. 10, 1962

3,028,694
CARRYING TYPE SCRAPER
John H. Creighton, Davenport, Iowa, assignor to Deere & Company, Moline, Ill., a corporation of Delaware
Filed Jan. 27, 1960, Ser. No. 4,949
7 Claims. (Cl. 37—129)

This invention relates to an earth moving piece of equipment of the scraper type and more particularly relates to a scraper type implement which has a mobile box with a cutting edge at its forward end which normally cuts the top layer of the earth. Still more particularly this invention relates to an elevator in the scraper which operates in conjunction with the cutting blade to move the material or earth rearwardly and into the box.

A scraper of the above type is shown and described in a now pending application of Clarence T. Rasmussen and John H. Creighton, Ser. No. 847,007, filed October 16, 1959. The structure described in the aforementioned application is similar to the structure presently to be described and includes a box-like structure open at its forward end with the floor of the structure having a forward cutting edge adapted to engage the upper surface of the ground and to move a layer of material into the rear portion of the box. Cooperating with the cutting edge is an inclined elevator structure having its lower end overlying and adjacent to the cutting edge and inclined upwardly and rearwardly to an upper end. The elevator is composed of a pair of transversely spaced chains carrying longitudinally spaced flights which engage the earth moving over the cutting edge and aids in its movement rearwardly and into the box. The elevator is normally supported on the box by means of a pivoting arm structure, which permits the elevator to move vertically relative to the cutting edge. A problem with the aforedescribed type of scraper implement is that the elevator requires large and erratic amounts of power as each successive flight contacts or strikes the surface of material passing over the cutting edge. In many instances since the main power source or unit is used to propel the scraper over rough terrain, the additional surges required to operate the elevator will cause a reduction in speed and movement over the terrain.

It is therefore the main purpose of the present invention to provide a new and novel type of elevator which cooperates to move earth from the forward cutting edge and featuring a series of V-shaped flight elements lying normal to the chain runs and attached to the runs by means of brackets which extend in an advance direction from the face of the flights. Consequently as the flights move around the sprockets at the upper and lower end of the elevator the movement of the flights will be accelerated into a cutting or chopping action relative to the ground. Also, due to the fact that the flights are in a trailing direction relative to the direction of movement of the chains and due to their V-shaped contour, the edges of the flights will contact the ground gradually. To be more specific as the V-shaped flights pass around the lower sprockets, the outer ends of the V-shaped flights will first contact the ground and the edge of the flight will be introduced into the ground only gradually as the flight and its chains advance around the lower sprockets. In this manner the power increase or decrease required for driving the flight into the earth is gradual and the surge and extreme increase in power normally required to drive the flight into the ground is eliminated.

Other objects and advantages of the present invention will become apparent to those skilled in the art as the nature of the invention is better understood from the following description and as shown in the accompanying drawings.

Figure 1:
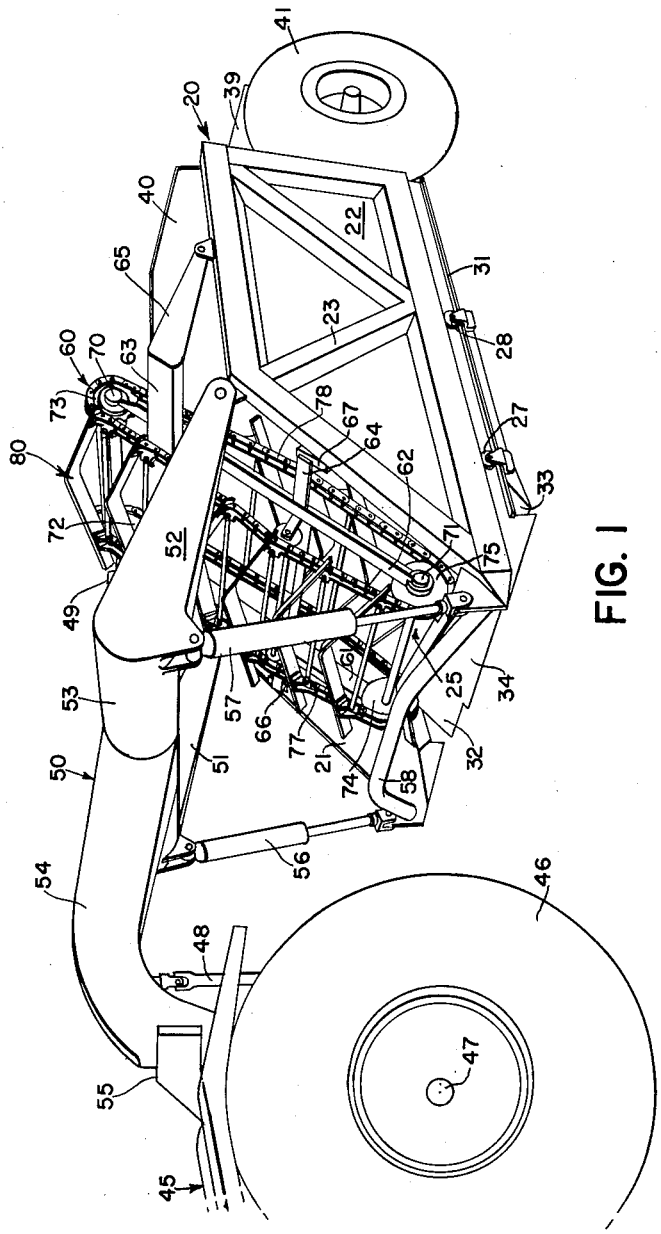
FIG. 1 is a front and side perspective view of a portion of a tractor and a trailing scraper type implement.

The scraper herein to be described is of the type set forth in detail in the aforementioned pending application, Ser. No. 847,007. Consequently the present description will be only general and if details of the scraper are desired, such may be had by reference to the pending application.

The scraper 20 is composed of an elongated dirt carrier or bowl formed by a pair of fore-and-aft extending upright side walls 21, 22. The side walls 21, 22 have super-structure or framework, such as at 23, which form with other such framework a main frame for the implement. The side walls 21, 22 are interconnected at their lower edges by a horizontally disposed floor composed of a front section 25 and a rear section which is not shown. The front section 25 is provided with rollers such as at 27, 28 on opposite edges which ride on longitudinally extending tracks, such as at 31, on lower edges of the side walls 21, 22. Consequently, the front floor section 25 may slide under the rear floor section for purposes of discharging the material from the box. A hydraulically controlled linkage system, not shown, is retained at the rear of the scraper bowl for the purpose of moving the forward section 25 between its rear and forward positions. The floor section 25 supports forward cutting blades 32, 33 at opposite ends and a centrally located cutting blade 34 which conventionally depends further and cuts deeper than the outer edge blades 32, 33. The bowl 20 is closed at its rear by a rear wall or ejector plate 40 which is adjustable longitudinally. The bowl 20 is carried at its rear by wheels 41 carried on a rearwardly projecting frame 39.

A conventional type tractor 45 is provided to pull the implement and includes rear traction wheels 46 carried on a rear transverse axle 47. Supplied with the tractor is a power take-off shaft, not shown, which operates a drive shown partially at 48, 49 in FIG. 1. The drive system between the tractor and scraper is the subject matter of the pending application of Clarence T. Rasmussen and John H. Creighton, Ser. No. 785,203, filed January 6, 1959 and details of the drive system may be had by reference to that application. It is, however, felt that the details of the basic drive have no bearing on the present invention other than to recognize the fact there are means provided for operating the elevator on the scraper.

The scraper bowl or body 20 is connected to the tractor by means of a Y-shaped beam or yoke structure indicated in its entirety by the reference numeral 50. The latter structure includes a pair of transversely spaced leg portions 51, 52 interconnected at their forward ends by a transverse beam 53. Rear ends of the leg portions 51, 52 are pivotally mounted to the upper edges of the side walls 21, 22 so as to permit relative vertical movement between the beam structure and bowl 20. Projecting forwardly from the cross beam 53 is a longitudinally extending beam 54 having a hitch connection 55 at its forward end. The hitch 55 permits a wide range of articulation between the beam 54 and the tractor 45. Extending between the cross beam 53 and the forward lower ends of the side walls 51, 52 are hydraulic units 56, 57, controllable on the operator's station on the tractor, which operate to adjust the depth of cut as well as the position of the bowl or scraper 20 relative to the ground. A cross beam 58 extends across the forward open end of the bowl and effects transverse rigidity at the forward end.

Positioned in the forward or open end of the bowl or carrier 20 is an inclined elevator, indicated in its entirety by the reference numeral 60. The elevator 60 has a main rigid frame composed of side members 61, 62 rigidly interconnected by an upper transverse beam structure 63. Opposite ends of the beam structure 63 are connected rigidly with rearwardly extending arms 65 pivotally mounted on the walls 21, 22. The side frames 61, 62 are also rigidly interconnected by a lower brace or strap 64 having outer ends contacting metal pads 66, 67 welded to the inside surfaces of the side walls 21, 22 adjacent the inclined upper forward edge of the respective walls. The pads 66, 67 limit downward movement of the elevator 60.

The upper and lower ends of the side beams 61, 62 support transverse shafts 70, 71 respectively which have rotary guides mounted thereon in the form of drive sprockets 72, 73 and idler rollers 74, 75 respectively. The sprockets 72, 74 are transversely spaced from rollers 73, 75 and operate as guides for transversely spaced continuous chains or flexible elements 77, 78 respectively. The lower rollers 74, 75 at the lower end of the elevator 60 are positioned adjacent to and above the central cutting blade 34. The sprocket drive shaft 70 extends into the gear transmission housing 49 and is so driven as to drive the lower runs of the continuous chains 77, 78 upwardly and the upper runs downwardly.

Figure 4:
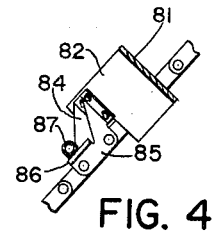
FIG. 4 is a sectional view taken substantially along the line 4—4 of FIG. 2.

The chains 77, 78 are interconnected by means of a series of longitudinally spaced V-shaped transverse flight elements 80. The flights 80 are of a one-piece strap construction and are disposed normal to the upper and lower runs of the chains 77, 78. Each of the flight elements 80 have a centrally located apex portion 81 and oppositely disposed and diverging end portions 82, 83 extending beyond and adjacent to the respective chains 77, 78. Viewing FIG. 4, it becomes apparent opposite edges of each of the flight portions 81 extend above and below its respective chain run. The outer end portions 82, 83 are recessed or stepped adjacent the chain runs so as to permit a deeper cut of the flight into the material. The apex portion 81 extends in a trailing direction relative to the direction of movement of the chains 77, 78. Extending in advance of the flight elements 80 and adjacent each of the chains 77, 78 are longitudinally extending brackets 84, 85 which are bolted to the face of the flight elements 80 and extend on opposite sides of the chains 77, 78. The advance portion of the brackets 84, 85 have openings receiving the pivot pins of the chain links. Consequently the advanced portions of the brackets 84, 85 operate as a link in the chains 87, 88. The brackets 85 are provided with laterally disposed plate 86 extending inwardly from the respective chains 77, 78. Bolted to the plates 86 are transverse rods 87 which brace the flight elements 80 and the chains 78, 77 against distortion.

Figure 3:
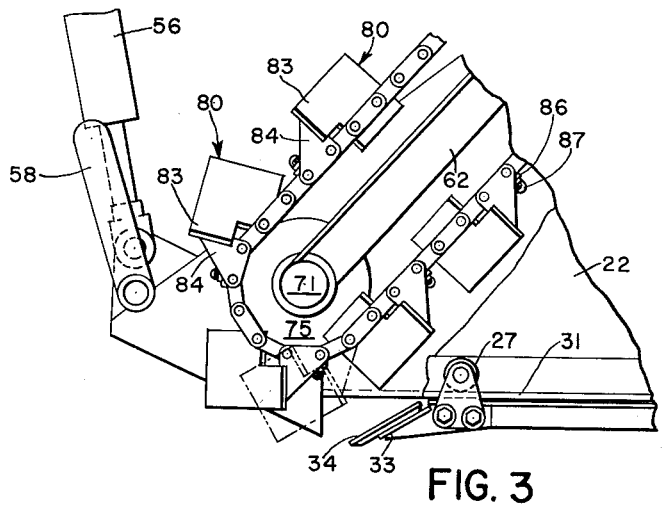
FIG. 3 is a sectional view taken substantially along the line 3—3 of FIG. 2.
Figure 2:
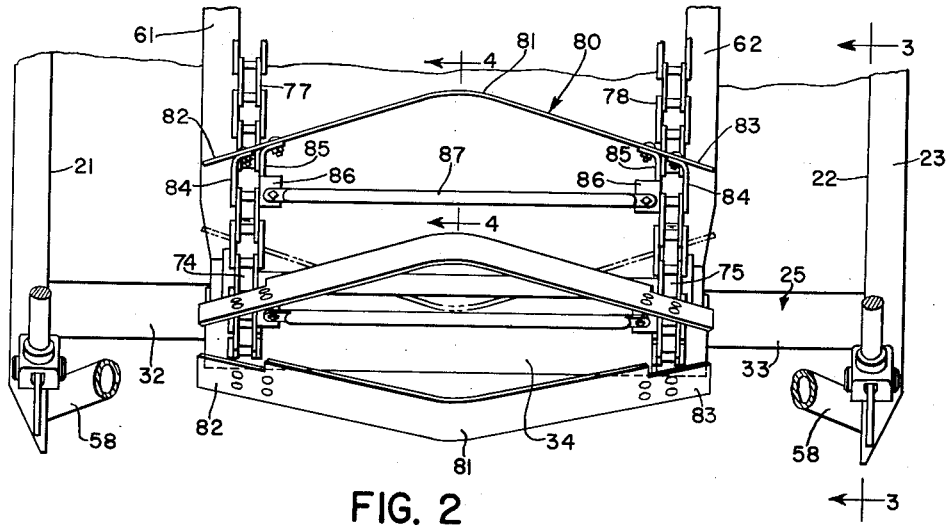
FIG. 2 is a front view of the lower forward end of the implement with portions broken away for purposes of clarity.

The elevator operates in the following manner. Viewing FIGS. 2 and 3 for the moment, the flight elements 80, as they advance over the lower rollers 74, 75, will generally depart from the chain run. As the flights move under the sprockets 74, 75, as will become apparent in viewing FIG. 3, the outer ends 82, 83 of the flight portion first contact the earth or soil moving over the cutter blade 34. As the flight progresses around the sprockets the flight will continually dig into the dirt until the entire lower edge of the flight is in contact with the dirt or soil. There will not be a great deal of power required for this operation since digging of the flight 80 into the soil will be gradual and will not occur instantaneous throughout the length of the flight. Consequently there will be a considerable reduction in the power required for driving the flight into the dirt as compared with the more or less conventional elevator flight. It should be recognized that once the flight 80 has passed around the rollers 74, 75, it will again assume its normal operational position in which the flight is normal to the lower runs of the chains 77, 78. Also, it should be recognized that as the flights 80 move up the under side of the elevator 60, they will operate as cups so as to aggressively maintain the earth or soil in the flights.

While only one form of the invention has been shown it should be recognized that other forms and variations will occur to those skilled in the art. Therefore, while the present disclosure was described and shown in detail for the purpose of clearly and concisely illustrating the principles of the invention, it was not the intention in so describing it to limit or narrow the invention beyond the broad concepts set forth in the appended claims.

What is claimed is:

1. For use in a material scraper having a material carrying body with a forwardly disposed and transverse cutting blade adapted to contact and cut the surface of the material as the scraper body moves forwardly, a material elevating structure having a lower end overlying and adjacent the forward cutting edge and extending upwardly and rearwardly to an upper end, said elevating structure comprising: a rigid inclined elevator frame having upper and lower ends respectively, said lower end being forward of the cutting blade; transversely spaced rotary guides on each of said upper and lower ends; transversely spaced continuous chains mounted over the respective guides, each having upper and lower runs respectively; means driving said guides for effecting movement of the lower runs upwardly and the upper runs downwardly; V-shaped transverse flight elements spaced longitudinally along the chains, each of said flight elements lying normal to the chain runs and extending from oppositely disposed end portions adjacent the respective chains to a central and trailing apex portion midway between the chains, each flight element having outer cutting edges spaced outwardly from the chains and diverging from said apex respectively to said end portions and said end portions respectively affording end edges meeting the cutting edges respectively at junctions shaped to provide sharp transversely spaced apart corners and said end edges extending thence respectively toward the chains; bracket means rigid with the flight elements and extending in advance thereof; means connecting advanced portions of the bracket means to the respective chains whereby the cutting edges of the flight elements will contact the material prior to its passing over the cutting blade; and transverse brace members rigidly interconnecting the bracket means.

2. For use in a material scraper having a material carrying body with a forwardly disposed and transverse cutting edge adapted to contact and cut the surface of the material as the scraper body moves forwardly, a material elevating structure having a lower end overlying and adjacent the forward cutting edge and extending upwardly and rearwardly to an upper end, said elevating structure comprising: a transverse inclined elevator frame having upper and lower ends respectively; transversely spaced rotary guides on each of said upper and lower ends of the frame; transversely spaced continuous flexible elements mounted over the rotary guides; drive means effecting movement of the flexible elements over the guide means; transverse flight elements spaced longitudinally along the flexible elements, each of said flight elements lying normal to the flexible elements and extending from oppositely disposed advanced end portions adjacent the respective flexible elements to a trailing portion between the flexible elements, each flight element having outer cutting edges spaced outwardly from the flexible elements and diverging from said central portion respectively to said end portions and said end portions respectively affording end edges meeting the cutting edges respectively at junctions shaped to provide sharp transversely spaced apart corners and said end edges extending thence respectively toward the flexible element; and means connecting the end portions to the respective flexible elements.

3. The invention defined in claim 2 further characterized by the flight elements being V-shaped with the apex portion thereof extending in a trailing direction relative to the direction of movement of the flexible elements.

4. The invention defined in claim 2 further characterized by the advanced end portion being rigidly connected by transverse brace means in advance of the trailing portion of the flight elements.

5. The invention defined in claim 2 further characterized by the flexible elements having oppositely disposed runs and the flight elements have opposite edges disposed inwardly and outwardly of the runs with recessed sections adjacent to and for receiving the flexible elements.

6. The invention defined in claim 2 in which the means connecting the flight elements to the flexible elements are longitudinal brackets which extend in advance of the flight elements and have advanced ends connected to the respective flexible elements and trailing ends connected to the flexible elements whereby a whipping action will occur with said flight elements as they pass around the rotary guide means.

7. The invention defined in claim 2 in which the flexible elements have oppositely disposed runs, the cutting edges of the flights are in a plane parallel to the runs and the end edges are substantially normal to the aforesaid plane.

References Cited in the file of this patent

UNITED STATES PATENTS

| | | |
|---|---|---|
| 874,982 | Norton | Dec. 31, 1907 |
| 979,200 | Prosser | Dec. 20, 1910 |
| 1,010,297 | Michener | Nov. 28, 1911 |
| 2,669,338 | Kling | Feb. 16, 1954 |
| 2,670,070 | Decat | Feb. 23, 1954 |
| 2,696,287 | Foust | Dec. 7, 1954 |
| 2,703,170 | Dmohowski | Mar. 1, 1955 |
| 2,791,041 | Hancock | May 7, 1957 |
| 2,791,044 | Hancock | May 7, 1957 |
| 2,930,478 | Ruffino | Mar. 29, 1960 |
| 2,931,451 | Hancock | Apr. 5, 1960 |
| 2,956,353 | Hanner | Oct. 18, 1960 |